United States Patent Office 3,336,256
Patented Aug. 15, 1967

3,336,256
OXYMETHYLENE POLYMERS STABILIZED BY
1,3-THIAZOLIDINE-2-THIONES
Irving Rosen, Painesville, Ohio, assignor to Diamond Alkali Company, Cleveland, Ohio, a corporation of Delaware
No Drawing. Filed Jan. 4, 1965, Ser. No. 423,373
16 Claims. (Cl. 260—45.8)

ABSTRACT OF THE DISCLOSURE

Oxymethylene homopolymers and copolymers are stabilized against thermal and oxidative degradation by mixing therewith from 0.1 to 1 percent, by weight, of a cyclic dithiocarbamate, such as 1,3-thiazolidine-2-thione, tetrahydro-1,3-thiazine-2-thione and 4-methyl-1,3-thiazolidine-2-thione. The stabilizing treatment is performed preferably in solutions of polymer in suitable solvents. Other stabilizing compounds, e.g., acyclic urea derivatives may be used in combination with the cyclic dithiocarbamate compound.

This invention relates to thermally stable thermoplastic compositions of matter. More particularly, it relates to oxymethylene polymers and to the method for improving their initial thermal stability.

Oxymethylene polymers have become, in recent years, well known in the art being prepared by polymerizing under substantially anhydrous conditions either formaldehyde or trioxane or by polymerizing other oligomers of formaldehyde. These polymers are thermoplastic materials of varying molecular weight composed of repeating oxymethylene —$CH_2O$— units joined together in linear chains which may be terminated at one or both ends by thermally unstable hydroxyl groups depending upon the method of preparation. Accordingly, these polymers will be degraded or decomposed to varying degrees when exposed to elevated processing temperatures.

Several means are presently employed to reduce degradation of oxymethylene polymers in processing, i.e., to improve their stability upon exposure to elevated temperatures. These methods primarily involve "capping" of the chain end-groups of the polymer and/or the introduction of different and more thermally stable units into the polymeric chain by copolymerization.

I have now found that the thermal stability of such oxymethylene polymers is still further improved by the incorporation therein of a cyclic dithiocarbamate represented by the structure

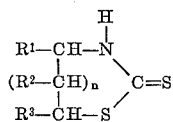

wherein $n=0$ to 1 and $R^1$, $R^2$ and $R^3$ are each selected from the group consisting of hydrogen and lower alkyl radicals containing up to 4 carbon atoms. Specific compounds of this class which are most advantageously employed in this invention are 1,3-thiazolidine-2-thione; tetrahydro-1,3-thiazine-2-thione and 4-methyl-1,3-thiazolidine-2-thione.

As used herein in the specification and claims the term "oxymethylene polymer" is intended to refer to oxymethylene homopolymers prepared from formaldehyde or from trioxane, which polymers have been stabilized after preparation by chemical treatment, particularly by etherification of their chain end-groups. It is likewise intended to refer to those oxymethylene copolymers which contain from 85 to 99.9 mol percent of recurring oxymethylene groups in combination with from 0.1 up to about 15 mol percent of oxyalkylene groups of two or more adjacent carbon atoms, which groups are derived from a cyclic ether monomer. Additionally, the term "oxymethylene polymer" is also intended to refer to novel oxymethylene copolymers containing from 90 to 99.9 mol percent of recurring oxymethylene groups interspersed with from 0.1 up to 10 mol percent of recurring units derived from a norbornadiene monomer, which copolymer will be hereinafter described. At present, the thermal stability of the copolymer materials is particularly improved by the process of this invention. For this reason, therefore, specific reference will be made hereinafter to these copolymers. Such reference is not to be taken, however, as limiting the present invention but merely as being illustrative thereof.

In general, the present invention involves intimately mixing with an oxymethylene polymer from about 0.1 up to 1 percent by weight of the cyclic dithiocarbamate compound as described above. The treated polymer subsequently shows a significantly improved thermal stability by comparison with the untreated polymer.

Oxymethylene homopolymers stabilized by the process of this invention are, as described earlier, known materials prepared from formaldehyde or from trioxane or other formaldehyde oligomers by processes described in numerous U.S. and foreign patents. The oxymethylene copolymers stabilized in this invention are those prepared from mixtures containing monomers as hereinafter described, preferably in combination with trioxane as the oxymethylene source, the reactant mixtures being copolymerized in the presence of cationic-type initiators known in the art, e.g., metal halides or coordinate complexes of a metal halide such as boron trifluoride with an organic compound in which oxygen or sulfur is the donor atom.

It has been reported that degradation of oxymethylene polymers in air at elevated temperatures may be caused by (1) oxidative attack on the hydrogen atoms in the polymeric chain by oxygen or by free radicals having oxidative activity; (2) by hydrolytic attack of oxygen in the polymeric chain by hydrogen ion or its equivalent; and/or (3) by degradation initiated at the end of the polymer chain which causes monomer units to successively break away from the polymer chain ends until a stable monomer unit is reached. With degradation, the polymer usually becomes significantly discolored and develops a disagreeable formaldehyde odor.

It is believed that the stabilizing efficiency of the cyclic dithiocarbamate compounds herein is due to their ability to act principally as scavenger compounds for destroying within the polymer the above described free oxidative radicals and compounds effecting hydrolytic attack. However, it is also possible that the dithiocarbamates may act in other ways to help stabilize the polymers.

The compositions of this invention are most conveniently prepared by dissolving the particular dithiocarbamate compound in a volatile solvent therefor and then adding to the polymer an amount of the prepared stabilizer solution sufficient to incorporate therein up to about 1 percent of the stabilizer by weight. Thorough mixing of the polymer and the stabilizer is accomplished preferably with agitation. Thereafter the solvent may be removed conveniently by evaporation. Typical suitable solvents for the dithiocarbamates useful in this invention are lower alkanoic alcohols, e.g., methanol or ethanol, acetone, benzene and low-boiling aliphatic hydrocarbons.

Alternatively, the dithiocarbamate compound used may be incorporated by dry blending the polymer and stabilizer together or by dissolving both the polymer and the stabilizer in a common solvent such as dimethyl formamide with subsequent evaporation of the solvent.

In general, the dithiocarbamate is admixed with the oxymethylene polymer in an amount not exceeding 2 percent, based on the weight of the polymer. However, an amount within the range of 0.25 to 0.75 percent by weight of the polymer generally has been found satisfactory and is preferred.

The stabilizing efficiency of the dithiocarbamate compound is determined by first weighing a sample of a treated oxymethylene polymer, then heating it for 30 minutes in an air-circulating oven maintained at 220° C., cooling and again weighing the treated polymer and determining the percentage of original polymer remaining, i.e., the percent stable polymer. As will be shown hereinafter by specific examples, the stabilized polymers of this invention generally are from 85 to 98 percent stable and usually remain colorless or become only slightly off-white in color, when tested as described. Similarly heated unstabilized polymers are significantly less stable, however, and become highly discolored.

When used as the sole stabilizing additive for the polymer, the cyclic dithiocarbamate compounds of this invention significantly improve its thermal stability. In practice, however, it oftentimes is preferred to employ these compounds in combination with other known stabilizing materials, particularly the acyclic urea derivatives such as dicyandiamide, guanidine and the like. The use of the dithiocarbamates and such other stabilizers in combination appears to provide more efficient stabilization to the polymer than can be accomplished by using comparable amounts of either type compound by itself. The acyclic urea derivatives generally may be so employed in amounts from 0.1 to 1 percent, by weight of the polymer. However, amounts of acyclic urea derivative from 0.1 to 0.5 percent by weight of the polymer provide, in combination with the cyclic dithiocarbamate, excellent stability to the polymer and are preferred.

The stabilized compositions of this invention may be processed into articles such as moldings, films, sheets, rods, tubes, fibers, filaments and the like by conventional molding, casting and/or extrusion operations currently practiced. In processing, these compositions may also include plasticizers, fillers, pigments, processing aids and the like which are often-times employed when processing thermoplastic materials.

In order that those skilled in the art may more completely understand the present invention and the preferred methods by which the same may be carried into effect, the following specific examples are offered. In these examples and elsewhere herein, parts and percentages given are by weight, unless otherwise specified.

*Example 1*

A trioxane-norbornadiene copolymer is prepared in the absence of an organic liquid reaction medium essentially as described in my copending application U.S. Serial No. 346,099, filed February 20, 1964 (now abandoned), as follows.

A 100 ml., round-bottom flask, equipped with an agitator, a thermometer, a rubber serum cap and with nitrogen inlet and outlet tubes is heated in an oil bath to 105° C. and is flushed with nitrogen. Thirty-five and two-tenths grams of trioxane, 1.07 g. of norbornadiene and 0.01 g. of boron trifluoride dibutyl etherate are charged to the flask with agitation and are reacted for 1 hour at 105° C. The reaction mixture is then cooled and discharged from the flask. The solid product mass is pulverized by grinding in a Waring Blendor containing acetone. The pulverulent copolymer is leached well with acetone and then dried under vacuum at 50° C. The copolymer contains 0.5 mol percent of units derived from norbornadiene as determined by elemental analysis. It has an inherent viscosity of 0.87.

A sufficient quantity of 1 percent solutions in methanol of the dithiocarbamate stabilizers listed in the following table is added to separate 1 g. portions of this copolymer to incorporate percentages of the stabilizers as indicated. Other 1 g. portions of the copolymer are similarly treated with the dithiocarbamate and dicyanidiamide stabilizers in combination. After thorough mixing, the polymer-stabilizer solution slurries are allowed to stand until all of the methanol is evaporated and the treated polymers maintain constant weight.

The treated polymer samples are heated in an air-circulating oven for 220° C. for 30 minutes. They are then removed from the oven, cooled and reweighed and the percentage of stable polymer remaining is calculated. Results are as follows:

TABLE I

| Stabilizer | Percent Stabilizer | Percent Stable Copolymer After Exposure at 220° C. for 30 Minutes |
|---|---|---|
| None | 0.0 | 68 |
| 1,3-thiazolidine-2-thione | 0.75 | 98 |
| 1,3-thiazolidine-2-thione | 0.50 | 99 |
| Dicyandiamide | 0.10 |  |
| Dicyandiamide | 0.10 | 14 |
| Tetrahydro-1,3-thiazine-2-thione | 0.75 | 100 |
| 4-methyl-1,3-thiazine-2-thione | 0.75 | 98 |
|  | 0.50 | 90 |

As the above data indicate, the thermal stability of the oxymethylene copolymer composition is significantly improved by the cyclic dithiocarbamate stabilizers of this invention. Additionally, the data indicate the enhanced stabilizing action obtained by using the dithiocarbamate compound and dicyandiamide in combination. During the heat treatment, all of the dithiocarbamate-containing copolymer samples of this example become slightly off-white in color, while that containing only dicyandiamide turns dark brown.

*Example 2*

Following the procedure as outlined in Example 1, 1 g. portions of the copolymer containing 98.5 mol percent of units derived from trioxane and 1.5 mol percent of units derived from 1,3-dioxolane are blended with the stabilizers shown in the following table. The treated copolymer samples are then heated at 220° C. for 30 minutes and the stability of each heated sample is determined as described in Example 1. Results are as follows:

TABLE II

| Stabilizer | Percent Stabilizer | Percent Stable Copolymer After Exposure at 220° C. for 30 Minutes |
|---|---|---|
| None | 0.0 | 5 |
| 1,3-thiazolidine-2-thione | 0.75 | 94 |
| Tetrahydro-1,3-thiazine-2-thione | 0.75 | 85 |
| 1,3-thiazolidine-2-thione | 0.50 | 73 |
| Dicyandiamide | 0.10 |  |

During the heat treatment, all of the copolymer samples become off-white in color.

*Example 3*

Using the apparatus outlined in Example 1, a trioxane-norbornadiene copolymer is prepared in an organic liquid reaction medium. Forty-nine and four-tenths g. of trioxane, 15 g. of cyclohexane, 1.5 g. of norbornadiene and 0.03 g. of boron trifluoride dibutyl etherate are charged to the reaction flask with agitation. Under a slight positive nitrogen pressure the resulting mixture is reacted at 50° C. for 1⅓ hours. It is then cooled and discharged from the flask. The solid product mass is isolated by filtration and is pulverized by grinding in a Waring Blendor containing acetone. The pulverulent product is leached with acetone and is dried under vacuum at 50° C. The finished copolymer is found by elemental analysis to contain 0.6 mol percent of norbornadiene. It has an inherent viscosity of 1.08, which value is determined at 60° C. employing a 0.5 percent solution of the copolymer in p-chlorophenol containing 2 percent of a-pinene by weight. Calculating from the inherent viscosity value, the copolymer of this example has an average polymer molecular weight of 20,000.

Following the previously described procedure, separate portions of this copolymer are each mixed with the stabilizers shown in the following table and then heated, after which the stability of each heat-exposed copolymer sample is determined. Results are as follows:

TABLE III

| Stabilizer | Percent Stabilizer | Percent Stable Copolymer After Exposure at 220° C. for 30 Minutes |
|---|---|---|
| None | 0.0 | 23 |
| Tetrahydro-1,3-thiazine-2-thione | 0.75 | 93 |
| | 0.50 | 85 |
| | 0.25 | 75 |
| Tetrahydro-1,3-thiazine-2-thione | 0.50 | } 95 |
| Dicyandiamide | 0.10 | |
| Tetrahydro-1,3-thiazine-2-thione | 0.24 | } 88 |
| Dicyandiamide | 0.10 | |
| 1,3-thiazolidine-2-thione | 0.50 | 57 |
| 1,3-thiazolidine-2-thione | 0.50 | } 94 |
| Dicyandiamide | 0.10 | |
| 4-methyl-thiazolidine-2-thione | 0.50 | } 88 |
| Dicyandiamide | 0.10 | |

*Example 4*

Following the method described in British Patent 917,016, issued on January 30, 1963, a polyoxymethylene glycol is treated with triethyl orthoformate in the presence of boron trifluoride diethyl ether catalyst to replace the hydrogen atoms in the terminal hydroxyl groups of the polymer chains with ethyl groups. This polymer has an inherent viscosity of 1.0.

The polyoxymethylene ether polymer is admixed as previously described with 0.5 percent by weight of tetrahydro-1,3-thiazine-2-thione. A weighed portion of the treated polymer exposed in air at 220° C. for 30 minutes remains 89 percent stable whereas only 30 percent of the untreated polymer is recovered after similar oven exposure.

*Example 5*

A trioxane-norbornadiene copolymer prepared as described in the previous examples contain 1.2 mol percent of norbornadiene in it polymeric rearranged form.

Separate 1-gram portion of this copolymer are each mixed with 1,3-thiazolidine-2-thione either by itself or in combination with dicyandiamide in the quantities indicated in the table below. An additional copolymer sample is mixed with 0.10 percent of dicyandiamide. The treated copolymer samples are then heat-exposed as previously described. Results are as follows:

TABLE IV

| Stabilizer | Percent Stabilizer | Percent Stable Copolymer After Exposure at 220° C. for 30 Minutes |
|---|---|---|
| None | | 30 |
| 1,3-thiazolidine-2-thione | 0.75 | 91 |
| 1,3-thiazolidine-2-thione | 0.50 | } 98 |
| Dicyandiamide | 0.10 | |
| Dicyandiamide | 0.10 | 76 |

It is to be understood that although the invention has been described with specific reference to particular embodiments thereof, it is not to be so limited, since changes and alterations therein may be made which are within the full intended scope of this invention as defined by the appended claims.

What is claimed is:

1. A polymer composition comprising a normally solid, easily processed oxymethylene polymer and a stabilizing amount of a cyclic dithiocarbamate compound having the structure

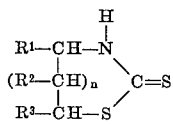

wherein $n$ is 0 to 1 and $R^1$, $R^2$ and $R^3$ are each selected from the group consisting of hydrogen and lower alkyl radicals containing up to 4 carbon atoms.

2. The polymer composition of claim 1 in which the said cyclic dithiocarbamate compound is present in an amount ranging between 0.1 up to 1 percent, by weight of the polymer.

3. The polymer composition of claim 1 in which the said cyclic dithiocarbamate compound is present in an amount ranging between 0.25 and 0.75 percent, by weight of the polymer.

4. The polymer composition of claim 1 in which the cyclic dithiocarbamate compound is 1,3-thiazolidine-2-thione.

5. The polymer composition of claim 1 in which the cyclic dithiocarbamate compound is tetrahydro-1,3-thiazine-2-thione.

6. The polymer composition of claim 1 in which the cyclic dithiocarbamate compound is 4-methyl-thiazolidine-2-thione.

7. A polymer composition comprising a normally solid, easily processed oxymethylene polymer and from 0.1 to 1 percent by weight of the polymer of a cyclic dithiocarbamate compound having the structure

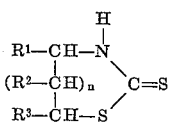

wherein $n$ is 0 to 1 and $R^1$, $R^2$ and $R^3$ are each selected from the group consisting of hydrogen and lower alkyl radicals containing up to 4 carbon atoms; the said oxymethylene polymer containing from 90 to 99.9 mol percent of recurring oxymethylene groups interspersed with from 0.1 up to 10 mol percent of recurring groups derived from norbornadiene.

8. A polymer composition comprising a normally solid, easily processed oxymethylene polymer and from 0.1 to 1 percent, by weight of the polymer, of a cyclic dithiocarbamate compound having the structure

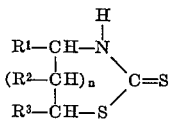

wherein $n$ is 0 to 1 and $R^1$, $R^2$ and $R^3$ are each selected from the group consisting of hydrogen and lower alkyl radicals containing up to 4 carbon atoms; the said oxymethylene polymer containing from 85 to 99.9 mol percent of recurring oxymethylene groups interspersed with from 0.1 up to 15 mol percent of recurring oxyalkylene groups having at least 2 adjacent carbon atoms, which oxyalkylene groups are derived from a cyclic ether.

9. The polymer composition of claim 8 in which the oxyalkylene groups are derived from 1,3-dioxolane.

10. A polymer composition comprising a normally solid polyoxymethylene ether and from 0.1 to 1 percent, by weight of the polymer, of a cyclic dithiocarbamate compound having the structure

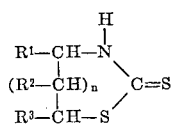

wherein $n$ is 0 to 1, and $R^1$ $R^2$ and $R^3$ are each selected from the group consisting of hydrogen and lower alkyl radicals containing up to 4 carbon atoms, the said polyoxymethylene ether polymer having an inherent viscosity of at least 1.0, as determined at 60° C. employing a 0.5 percent solution of the said polymer in p-chlorophenol containing 2 percent of a-pinene, by weight.

11. A polymer composition comprising a normally solid, easily processed oxymethylene polymer and stabilizing proportions of a cyclic dithiocarbamate compound and an acyclic derivative of urea, which derivative is selected from the group consisting of dicyandiamide and guanidine, the said heterocyclic dithiocarbamate having the structure

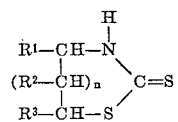

wherein $n$ is 0 to 1, and $R^1$, $R^2$ and $R^3$ are each selected from the group consisting of hydrogen and lower alkyl radicals containing up to 4 carbon atoms.

12. The polymer composition of claim 11 in which the said cyclic dithiocarbamate is present in amounts between about 0.1 and 1 percent and the said cyclic urea derivative is present in amounts between about 0.1 and 1.0 percent, by weight of the polymer.

13. The polymer composition of claim 11 in which the said cyclic dithiocarbamate is 1,3-thiazolidine-2-thione.

14. The polymer composition of claim 11 in which the said cyclic dithiocarbamate is tetrahydro-1,3-thiazine-2-thione.

15. The polymer composition of claim 11 in which the said cyclic dithiocarbamate is 4-methyl-thiazolidine-2-thione.

16. The polymer composition of claim 11 in which the said acyclic urea derivative is dicyandiamide.

References Cited

UNITED STATES PATENTS 3,020,264  2/1962  Behrends et al. _____ 260—67

FOREIGN PATENTS 1,386,582  12/1964  France.

OTHER REFERENCES

Rachinskii, Chem. Abstracts, vol. 57, 16585 and 16586 December 1962.

DONALD E. CZAJA, *Primary Examiner.*

M. J. WELCH, *Assistant Examiner.*